Dec. 1, 1953  L. H. SMITH ET AL  2,660,757
METHOD AND APPARATUS FOR PRODUCING TEXTURED FILMS
Filed Nov. 2, 1950  2 Sheets-Sheet 1
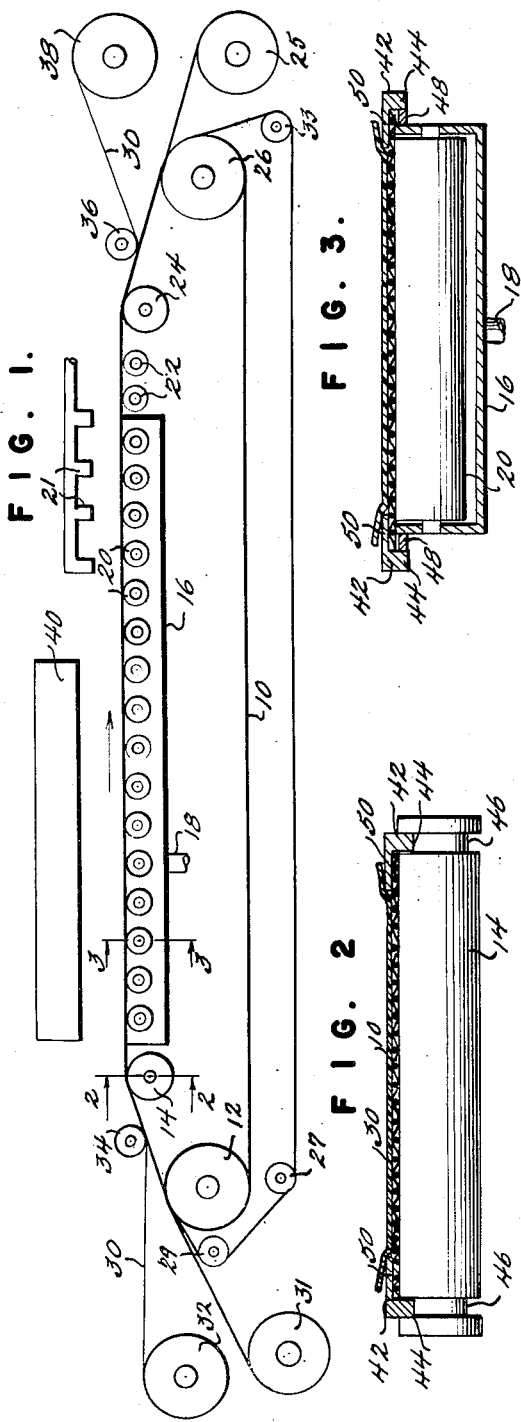
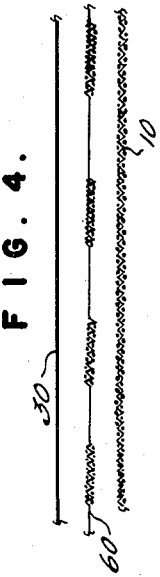
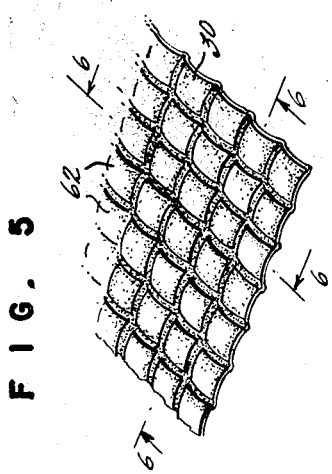
INVENTORS
LELAND H. SMITH
FRANK M. SMITH
BY
ATTORNEY Dec. 1, 1953     L. H. SMITH ET AL     2,660,757
METHOD AND APPARATUS FOR PRODUCING TEXTURED FILMS
Filed Nov. 2, 1950     2 Sheets-Sheet 2
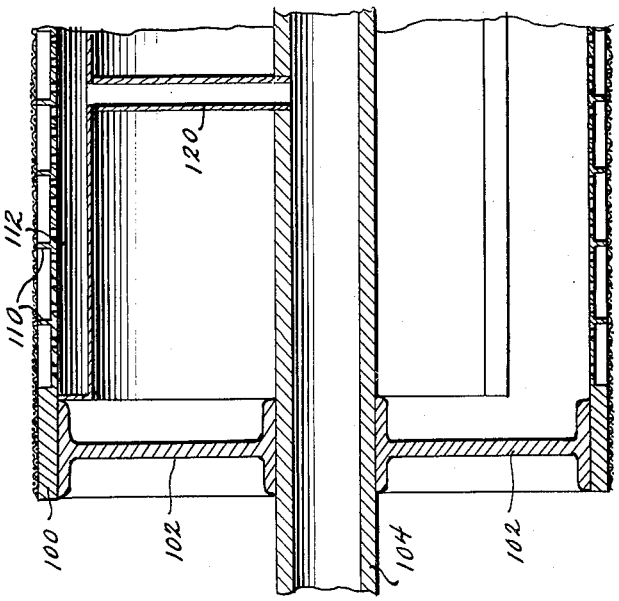
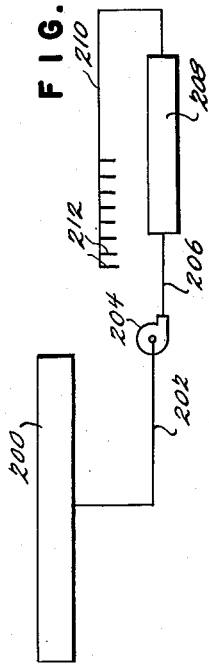
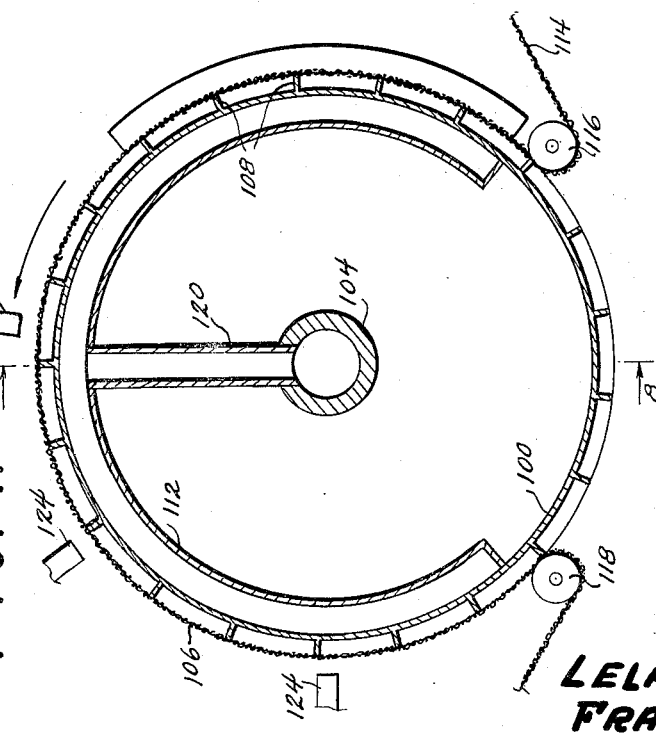
INVENTORS
LELAND H. SMITH
FRANK M. SMITH
BY
ATTORNEY

Patented Dec. 1, 1953

2,660,757

UNITED STATES PATENT OFFICE 2,660,757

METHOD AND APPARATUS FOR PRODUCING TEXTURED FILMS

Leland H. Smith and Frank M. Smith, Grenville, N. Y.

Application November 2, 1950, Serial No. 193,639

10 Claims. (Cl. 18—19)

It is the object of this invention to provide a method and apparatus for forming from an initially smooth, homogeneous plastic film or web a homogeneous, plastic film or web having a three-dimensional, two-sided, textured finish of any desired caliper, and to do this without substantial shrinkage of overall dimentions and without substantial decrease of strength.

As is well known, plastic films now are used for a great many purposes as a substitute for textiles, as in raincoats, shower curtains, drapes, etc., and such films have many advantages for such purposes. The industry has long sought for some means of giving plastic films a texture comparable to that of textiles. Until the present invention all of such efforts have involved one form or another of embossing operation in which the embossing is secured primarily by pressure. The results have been extremely limited in effect, have been impractical except for very light impressions on high or heavy caliper films, and all prior art treatments for the purpose of producing texture have resulted in an extreme loss of strength.

A further disadvantage in the prior art methods is that there is considerable investment tied up in etched or knurled rolls and in order to secure a change of pattern it has been necessary to etch or knurl a new roll. The present invention provides an infinite variety of patterns at very low cost and the change from one pattern to another may be made easily and quickly.

Another feature of the present invention is that while all manner of textured effects may be had, the caliper of the sheet remains substantially unchanged and, moreover, one side of the sheet is distinctly complementary of the other, so that both sides look substantially alike. As used herein the word "textured" means not only similar to textiles but includes any three-dimensional pattern.

The invention in all its aspects will be better understood from the following detailed description taken in connection with the annexed drawings, in which:

Figure 1 is a schematic elevation view of the apparatus used to practice the invention;

Figure 2 is a section on the line 2—2 of Figure 1;

Figure 3 is a section on the line 3—3 of Figure 1;

Figure 4 is a schematic section illustrating how a variety of different effects may be secured;

Figure 5 is a plan view in perspective of a sheet of the finished material;

Figure 6 represents a section taken on either of the lines 6—6 of Figure 5;

Figure 7 is a cross-sectional view illustrating another form of apparatus for carrying out the improved method;

Figure 8 is a section on the line 8—8 of Figure 7; and

Figure 9 is a diagrammatic view illustrating the pneumatic circuit of the machine.

Referring now to Figure 1 there is shown a foraminous, endless belt 10 preferably formed of wire mesh. At the leading end it passes over a roll 12, then over a guide roll 14 and then over a suction box 16 having a suction connection 18. Table rolls 20 are mounted within the box 16 to support the belt 10 against the effect of the suction. At the handling end of the suction box and outside the box are a few more table rolls 22. The belt then passes over a guide roll 24 and around a roll 26 whence it returns to the roll 12. A web of plastic material 30 is fed from a supply roll 32 and passes under a guide roll 34 into contact with the belt 10. At the opposite end of the machine the web 30 passes under a guide roll 36 and is wound up or otherwise disposed of in reel 38. A radiant heating member 40 mounted so as to be raised or lowered and having its temperature thermostat controlled is mounted above approximately the leading half of the suction box 16. A pair of belts 42 having side beads 44 are mounted at each margin of the belt 10. The beads 44 pass through grooves 46 in the rolls 12, 14, 24 and 26 and at the sides of suction box 16 bear on rods 48. The belts 42 have flanges 50 which bear on the margins of the belt 10 and act as vacuum seals.

Considered as endless belts the upper surface of the deckle straps is higher than the surface of the belt 10 and accordingly, if driven with the belt 10, there would be a certain amount of creep between the deckle straps and the belt 10. To overcome this the deckle straps at each end of the machine are separated from the belt 10 and pass over guide rolls 29, 27 and 33. A Reeves drive (not shown) drives the roll 33 from the roll 26 and permits an adjustment to be made to equalize the actual surface speeds of the deckle straps and the belt 10.

As the plastic web 30 passes over the suction box 16 it is drawn into perfect conformity with the belt 10. The heater member 40 is regulated as to temperature and the lineal speed of the belt 10 so as to soften the plastic. As the web 30 passes out from under the heater 40 it is still held in shape, that is, in conformity with the belt 10 by the prolongation of the suction box 16 and during its passage over the remainder of the suction box it cools below its temperature of plasticity. A plurality of air jets 21 are mounted above the trailing end of the belt 10 and are supplied with refrigerated air by means of the pneumatic circuit illustrated in Figure 9. The cooling of the film while firmly held in conformity with the belt (and whether air jets are used or not) has the effect of destroying plastic memory, particularly since the heating has been carried out almost to molten condition.

Assuming, as will usually be the case, that belt 10 is a woven wire mesh, the web 30 as it leaves the machine will retain a perfect impression of the surface of the belt 10. If other patterns are desired, a second, specially patterned belt may be superimposed on the belt 10. Such an arrangement is shown in Figure 4 in which a specially patterned belt 60 is superimposed on the belt 10 and underlies the plastic web 30 which will take an impression from the member 60.

Inevitably there will have to be a joint of some sort joining the ends of the belt 10 and this will leave equally spaced marks on the finished web. These finished webs are sold in lengths of fifty to seventy-five yards. Accordingly it is desirable to be able to produce such lengths without any intermediate occurrence of the joint marks but it is not always practical to provide a wire of any such length. To meet this problem the requisite length of patterned fabric is set up in a supply roll 31 and fed between the film 30 and the wire 10 and is rewound on a roll 25 at the opposite end. The roll 31 is replenished by moving roll 25 back to that position whenever it is desired to start a new length.

In Figure 5 and Figure 6 the web 30 is shown as having multiple projections 62 which are formed approximately equal on both sides of a median line. It is further to be noted that the caliper of the web on any line normal to the surface of the sheet is substantially uniform. It is this characteristic which maintains the strength of the textured web substantially unimpaired over the strength of the original, untextured web. This is what is meant by three-dimensional, two-sided, textured finish.

Referring now to Figures 7 and 8 there is shown a drum 100 which by means of spiders 102 is rotatably mounted on the fixed hollow shaft 104. The drum has a foraminous surface 106 supported on ribs 108 and annuli 110. This construction is conventional in pulp washers. An arcuate suction box 112 underlies most of the drum surface. A web 114 is fed over a guide roll 116 at the leading end of the suction box 112 and is removed over a guide roll 118 at the opposite end of the suction box 112. A duct 120 connects the suction box 112 with the interior of the hollow shaft 104 through which a vacuum is drawn. An arcuate heating element 122 is provided to overlie the leading portion of the suction box while cooling nozzles 124 are provided at intervals around the remaining surface of the drum.

The action in principle is precisely similar to that of the apparatus illustrated in Figure 1 except that deckle straps are not necessary. Clearly enough, in order to avoid joint marks an arrangement similar to the rolls 31 and 25 may be used if desired. Surprisingly enough, even when formed on a cylindrical surface such as the foraminous surface 106 of the drum 100, the resultant textured web has no more tendency to curl than when formed on the flat surface defined by the belt 10 of Figure 1.

In Figure 9 there is shown a suction box 200 corresponding either to the arcuate box 112 of Figures 7 and 8 or the rectangular box 16 of Figure 1. A line 202 connects the box 200 to the suction side of a compressor 204. There is always substantial leakage at the sides and ends of the suction area so that a substantial quntity of air must be handled. From the discharge side of the compressor 204 a line 206 takes the compressed air to a cooler 208 whence a line 210 takes the compressed air to nozzles 212 which correspond either to the nozzles 21 of Figure 1 or the nozzles 124 of Figure 7. The air expanding as it leaves the nozzles has a distinct refrigerating effect and greatly accelerates the cooling of the plastic film.

Very special effects can be obtained by feeding plastic scrap onto the surface of the belt 10 as it moves under the heater 40. It has been found that at the temperatures involved such scrap will make a weld to the film 30 so that effects in the nature of pile fabric can be secured.

The article produced by this invention is disclosed and claimed in our copending application Serial No. 193,640, filed of even date herewith and entitled "Three-Dimensional, Two-Sided, Textured Film."

While certain specific embodiments have been disclosed herein, it is not intended to limit this invention to the precise details disclosed but only as set forth in the subjoined claims which are to be broadly construed.

We claim:

1. A method of providing continuous smooth, homogeneous plastic films with a three-dimensional, two-sided textured finish comprising: advancing a length of smooth film over a foraminous, patterned surface; advancing said surface at the same rate as said film; applying vacuum to the underside of said surface to draw the film into conformity therewith while simultaneously heating said film to the temperature of plasticity; then cooling the film to well below the temperature of plasticity while retaining said vacuum; then releasing said vacuum and separating the textured film from said surface.

2. Apparatus for providing continuous smooth, homogeneous, plastic film with a three-dimensional, two-sided, textured finish comprising: an endless, foraminous member having a textured surface; means for advancing said member with a film of plastic in contact therewith; vacuum means to draw said film into conformity with the texture of said surface; means to heat the film to the temperature of plasticity while thus conformed; means to cool the film while still thus conformed and means to separate the film from said member.

3. Apparatus according to claim 2 in which the endless foraminous member is a belt.

4. Apparatus according to claim 2 in which the endless foraminous member is a drum.

5. Apparatus for providing a continuous smooth, homogeneous, plastic film with a three-dimensional, two-sided, textured finish comprising: an endless, foraminous belt; a suction box underlying said belt; table rolls supporting said belt over said suction box; a radiant heater overlying the leading portion only of said belt and said suction box; and means for advancing said belt over said suction box.

6. Apparatus as set forth in claim 5, including a foraminous belt having a textured pattern; said patterned belt overlying said foraminous belt.

7. Apparatus according to claim 5, including grooves at each side of said suction box and a deckle strap overlying and in contact with each side of said belt; each such strap having a bead entering one of said grooves, a part at least, of the portion of said straps overlying said belt underlying the film to be treated on said machine.

8. Apparatus for producing a textured finish in plastic films comprising: a rotatable drum having a foraminous, patterned surface; means for applying vacuum over a portion only of the surface of the drum; and heating means adjacent a portion only of that part of the drum subjected to vacuum.

9. Apparatus for providing smooth, homogeneous plastic film with a three-dimensional, two-sided finish comprising: an endless foraminous member, means for advancing said member, vacuum means underlying a portion of said endless foraminous member, means for feeding a foraminous patterned belt over said member, means for feeding a continuous web of smooth, homogeneous plastic material over said foraminous patterned belt whereby said suction means will draw said plastic web into conformity with said patterned belt, heating means covering the leading portion of said suction means and terminating short of the end of said suction means.

10. A method of providing continuous, smooth, homogeneous, plastic films with a three-dimensional, two-sided, textured finish comprising: advancing a length of smooth film over a foraminous, patterned surface; advancing said surface at the same rate as said film; applying vacuum to the under side of said surface to draw the film into conformity therewith while simultaneously heating said film to the temperature of plasticity; then cooling the film to well below the temperature of plasticity while retaining said vacuum; and then releasing said vacuum.

LELAND H. SMITH.
FRANK M. SMITH.

References Cited in the file of this patent

UNITED STATES PATENTS

| Number | Name | Date |
|---|---|---|
| 2,152,101 | Scherer | Mar. 28, 1939 |
| 2,354,916 | Hurt | Aug. 1, 1944 |
| 2,493,439 | Braund | Jan. 3, 1950 |
| 2,585,915 | Chavannes | Feb. 19, 1952 |